US 9,910,233 B2

(12) United States Patent
Tamura

(10) Patent No.: US 9,910,233 B2
(45) Date of Patent: Mar. 6, 2018

(54) OPTICAL MODULE

(71) Applicant: Hitachi Metals, Ltd., Tokyo (JP)

(72) Inventor: Kenichi Tamura, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/943,353

(22) Filed: Nov. 17, 2015

(65) Prior Publication Data

US 2016/0147017 A1    May 26, 2016

(30) Foreign Application Priority Data

Nov. 21, 2014    (JP) .................................. 2014-236753

(51) Int. Cl.
G02B 6/43    (2006.01)
G02B 6/42    (2006.01)

(52) U.S. Cl.
CPC ............. *G02B 6/43* (2013.01); *G02B 6/4206* (2013.01); *G02B 6/4214* (2013.01); *G02B 6/4215* (2013.01); *G02B 6/4249* (2013.01); *G02B 6/4265* (2013.01)

(58) Field of Classification Search
None
See application file for complete search history.

(56) References Cited

U.S. PATENT DOCUMENTS

| | | | | | |
|---|---|---|---|---|---|
| 4,244,045 A | * | 1/1981 | Nosu | .................. | G02B 6/29367 398/86 |
| 5,754,718 A | * | 5/1998 | Duck | .................. | G02B 6/2932 385/102 |
| 6,515,776 B1 | * | 2/2003 | Naganuma | ......... | G02B 6/29367 398/82 |
| 7,668,422 B2 | * | 2/2010 | Kropp | ................ | G02B 6/29367 359/577 |
| 9,042,731 B2 | | 5/2015 | Kurokawa et al. | | |
| 2008/0260331 A1 | * | 10/2008 | Takeda | ............... | G02B 6/29361 385/33 |
| 2013/0148966 A1 | * | 6/2013 | Kurokawa | ............. | H04J 14/02 398/65 |

FOREIGN PATENT DOCUMENTS

JP    2013-145356 A    7/2013

* cited by examiner

*Primary Examiner* — Chad H Smith
(74) *Attorney, Agent, or Firm* — Scully, Scott, Murphy & Presser, PC

(57) ABSTRACT

An optical module is composed of a plurality of optical elements to emit or receive light rays having wavelengths different from each other, and a plurality of optical members arranged in correspondence with the plurality of optical elements respectively. The plurality of optical members each of which includes a mirror section to transmit a predetermined transmission band wavelength light ray while reflecting a predetermined reflection band wavelength light ray, and a lens section located opposite the corresponding optical element. The plurality of optical members are positioned and disposed in such a manner that the respective lens sections thereof collimate or converge the light rays to be emitted or received by the plurality of optical elements respectively, while the respective mirror sections thereof multiplex or demultiplex the light rays to be emitted or received by the plurality of optical elements respectively.

6 Claims, 12 Drawing Sheets

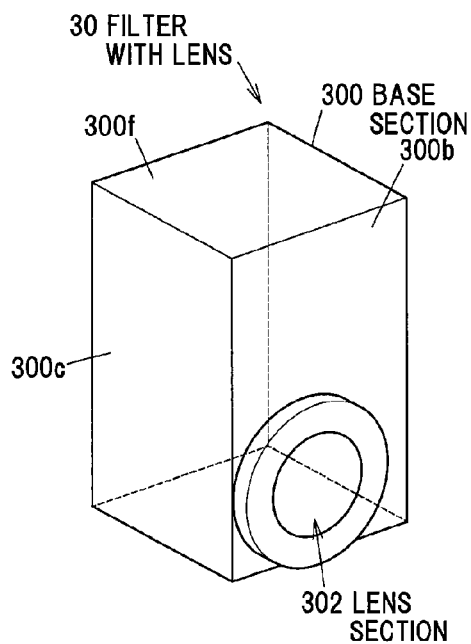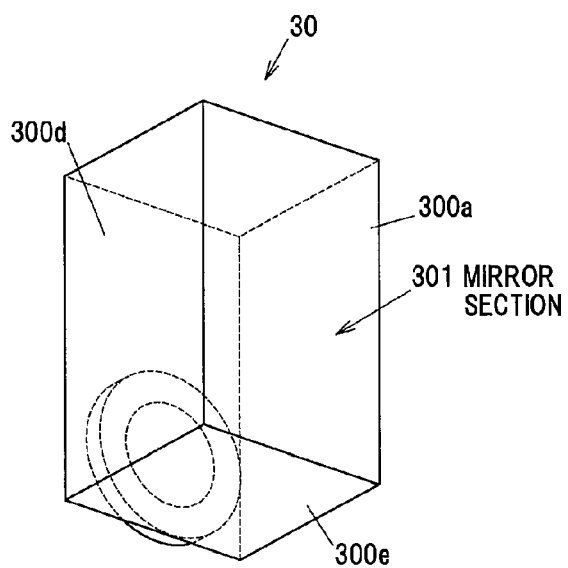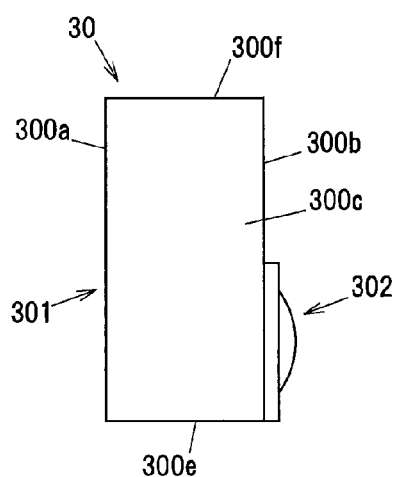

OPTICAL MODULE

The present application is based on Japanese patent application No. 2014-236753 filed on Nov. 21, 2014, the entire contents of which are incorporated herein by reference.

BACKGROUND OF THE INVENTION

1. Field of the Invention

This invention relates to an optical module, which is designed to perform a wavelength division multiplexed communication using an optical fiber as a signal transmission medium.

2. Description of the Related Art

Conventionally, as an optical module designed to perform a wavelength division multiplexed communication using an optical fiber as a signal transmission medium, an optical communication module as described in Patent Document 1 below is known.

The optical communication module as described in Patent Document 1 has a vacuum sealed package, and a sleeve for an end of the optical fiber to be inserted therein. Within the package, a mounting base made of a plate shaped metal is arranged, and an optical member is formed on that mounting base. The optical member is composed of a light emitting portion, and a light multiplexing portion for multiplexing light emitted from that light emitting portion. The light emitting portion has four light source devices (semiconductor lasers), four optical lenses (collimating lenses), two light reflecting plates, and two wavelength selecting filters, and the light multiplexing portion includes one light reflecting plate and one polarization selecting filter. The wavelength selecting filters have the function of reflecting light of a predetermined wavelength, while transmitting light of other wavelengths.

Light rays emitted from the four light source devices respectively are converted by the four optical lenses into collimated light rays respectively, and multiplexed by the two light reflecting plates and the two wavelength selecting filters of the light emitting portion into a first multiplexed light ray and a second multiplexed light ray. The first multiplexed light ray and the second multiplexed light ray emitted from the light emitting portion are further multiplexed at the light multiplexing portion into one multiplexed light ray, which is passed through an isolator and an optical lens, which are arranged within the sleeve, and into the optical fiber inserted in the sleeve.

[Patent Document 1] JP-A-2013-145356

SUMMARY OF THE INVENTION

In the optical communication module as described in Patent Document 1, in order to efficiently pass the multiplexed light ray composed of the light rays emitted from the plurality of light source devices and multiplexed together into the optical fiber, it is necessary to accurately position the constituent components of the optical member, such as the plurality of light source devices, the plurality of optical lenses, the plurality of light reflecting plates, the plurality of wavelength selecting filters and the like. This positioning has become more difficult with increasing number of constituent components of the optical member, leading to an increase in assembling time and an increase in cost.

Accordingly, it is an object of the present invention to provide an optical module, which is capable of reducing the number of components, and thereby enhancing productivity.

According to an embodiment of the invention, an optical module comprises:

a plurality of optical elements to emit or receive light rays having wavelengths different from each other; and a plurality of optical members arranged in correspondence with the plurality of optical elements respectively, the plurality of optical members each including a mirror section to transmit a predetermined transmission band wavelength light ray while reflecting a predetermined reflection band wavelength light ray, and a lens section located opposite the corresponding optical element, the plurality of optical members being positioned and disposed in such a manner that the respective lens sections thereof collimate or converge the light rays to be emitted or received by the plurality of optical elements respectively, while the respective mirror sections thereof multiplex or demultiplex the light rays to be emitted or received by the plurality of optical elements respectively.

In the embodiment, the following modifications and changes may be made.

(i) The optical members each of which includes a translucent polyhedral base section in such a manner that the respective mirror sections thereof are formed on respective one side surfaces of the respective polyhedral base sections respectively, while the respective lens sections thereof are provided on respective side surfaces different from the respective one side surfaces of the respective polyhedral base sections with the respective mirror sections formed thereon respectively.

(ii) The bases of the optical members are in a rectangular cuboid shape in such a manner that the respective lens sections thereof are provided on respective opposite side surfaces to the respective one side surfaces respectively, wherein central axes of optical paths of the light rays transmitted through the lens sections are tilted relative to central axes of the lens sections respectively.

(iii) The plurality of optical elements are light emitting elements that emit light rays having wavelengths different from each other, wherein the optical module further includes a reflecting member with a reflecting surface to reflect the light rays transmitted through the respective mirror sections of other optical members excluding one of the plurality of optical members, wherein the plurality of optical members are arranged in a column in such a manner that the respective mirror sections thereof are parallel to the reflecting surface of the reflecting member, wherein the light rays transmitted through the respective mirror sections of the other optical members are reflected off the reflecting surface of the reflecting member and are incident on the respective mirror sections of adjacent optical members respectively, in such a manner that the signal light rays of the plurality of optical elements are superimposed together.

(iv) The plurality of optical elements are light receiving elements to receive a light ray and convert it into an electric signal, wherein the optical module further includes a reflecting member with a reflecting surface parallel to the respective mirror sections of the plurality of optical members, wherein the plurality of optical members are arranged in a column in an alignment direction parallel to the reflecting surface of the reflecting member, wherein a wavelength division multiplexed light ray composed of a multiplicity of light rays having different wavelengths multiplexed therein is incident on the mirror section of one of the plurality of optical members, wherein the light rays reflected off the respective mirror sections of the optical members and the reflecting surface of the reflecting member are, in turn, incident on other adjacent optical members respectively in the alignment direction, excluding the one of the plurality of optical members.

(v) The plurality of optical members are arranged in double columns in such a manner that the respective mirror sections thereof face each other, wherein the plurality of optical elements are arranged in double columns in such a manner as to be located opposite the respective lens sections of the optical members arranged in the double columns respectively, and the plurality of optical elements emit the light rays having wavelengths different from each other toward the lens sections respectively, wherein the light rays transmitted through the respective mirror sections of optical members in one column of the plurality of optical members disposed in the double columns are reflected off the respective mirror sections of optical members in an other column, in such a manner that the signal light rays of the plurality of optical elements are, in turn, superimposed on top of each other.

(vi) The plurality of optical members are arranged in double columns in such a manner that the respective mirror sections thereof face each other, wherein the plurality of optical elements are arranged in double columns in such a manner as to be located opposite the respective lens sections of the optical members arranged in the double columns respectively, wherein a wavelength division multiplexed light ray composed of a multiplicity of light rays having different wavelengths multiplexed therein is incident on the mirror section of one of the plurality of optical members, wherein the light rays reflected off the respective mirror sections of the optical members in the opposite columns are incident on other optical members respectively excluding the one of the plurality of optical members, wherein the light rays transmitted to be dispersed through the mirror sections, and converged by the lens sections are passed, in turn, into the plurality of optical elements respectively.

Points of the Invention

The optical module of the present invention allows for reducing the number of components, and thereby enhancing productivity.

BRIEF DESCRIPTION OF THE DRAWINGS

The preferred embodiments according to the invention will be explained below referring to the drawings, wherein:

FIG. 2A is a perspective view showing a filter with its lens;

FIG. 2B is a perspective view showing the filter with its lens when viewed from the opposite side in FIG. 2A;

FIG. 2C is a side view showing the filter with its lens;

DETAILED DESCRIPTION OF THE PREFERRED EMBODIMENTS

[First Embodiment]

Figure 1:
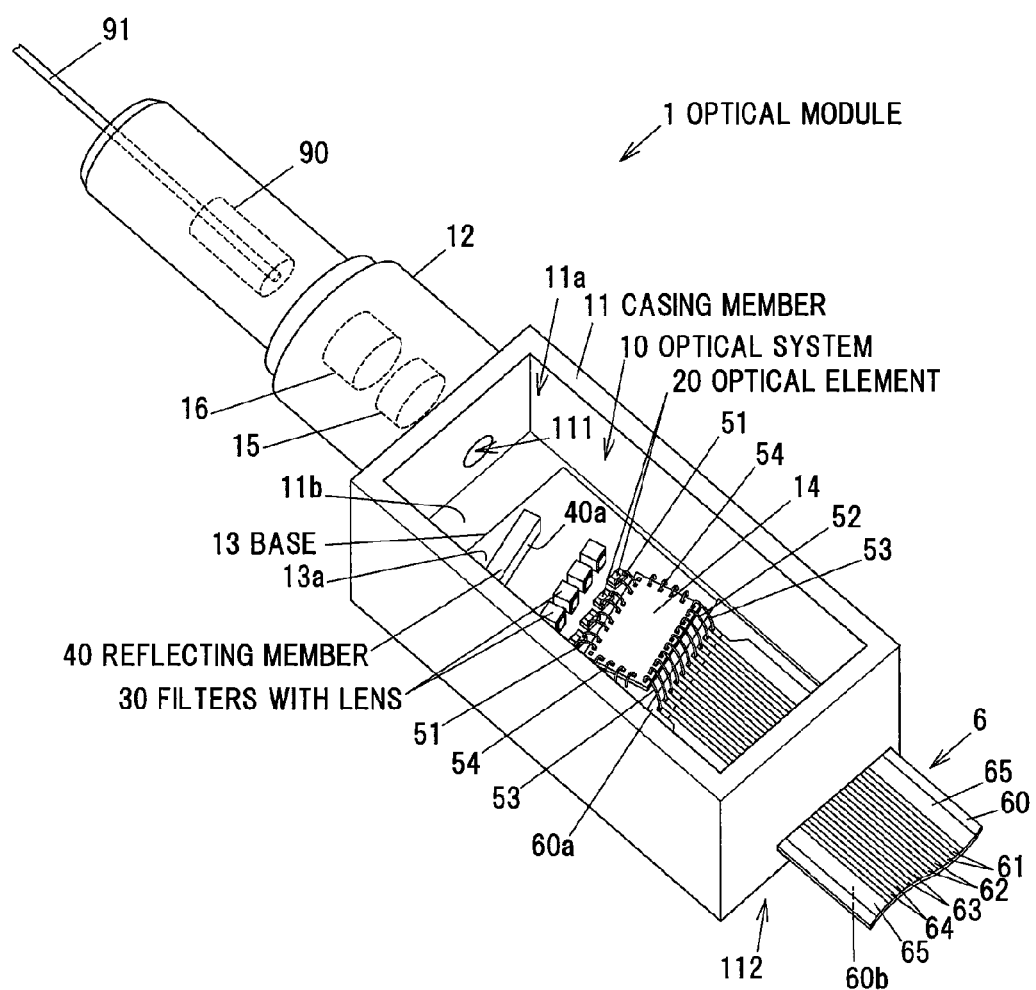
FIG. 1 is a perspective view showing a configuration of an optical module in a first embodiment according to the present invention.

FIG. 1 is a perspective view showing a configuration of an optical module 1 in a first embodiment of the present invention.

(Configuration of the Optical Module)

In this embodiment, the optical module 1 is provided with an optical system 10 for optical signal transmission in wavelength division multiplexed communication. The optical module 1, as shown in FIG. 1, includes a casing member 11 having a receiving space 11a inside, a ferrule 90, a sleeve 12 for receiving one end of an optical fiber 91 held in that ferrule 90, a base 13 received in the receiving space 11a, the optical system 10 mounted on the base 13, a driving element 14 mounted on the base 13, an optical isolator 15 held in the sleeve 12, and a lens 16 held in the sleeve 12.

The casing member 11 is in a rectangular cuboid shape, and is coupled to the sleeve 12 on one side surface thereof. That side surface is formed with a light passing hole 111 for light to be passed therethrough. Also, the casing member 11 is formed with a slit 112 on its opposite side surface to its side surface coupled to the sleeve 12, and a plate shaped wiring member 6 is introduced through that slit 112 into the receiving space 11a at one end thereof. The base 13 is fixed by, for example bonding to a bottom surface 11b of the receiving space 11a in the casing member 11. Incidentally, the casing member 11 has the body shown in FIG. 1, and a lid for closing the opening of the body, but in FIG. 1, this lid is omitted, and the interior of the receiving space 11a is illustrated.

The optical system 10 includes a plurality (four in this embodiment) of optical elements 20 to emit light rays having wavelengths different from each other, a plurality (four in this embodiment) of filters 30 with their respective lenses configured as optical members, which are arranged in correspondence with the plurality of optical elements 20 respectively, and a reflecting member 40 to reflect the light rays transmitted through the filters 30 with their respective lenses.

The optical elements 20, the filters 30 with their respective lenses, and the reflecting member 40 are mounted on the base 13, and are fixed with an adhesive. The reflecting member 40 includes a plane located opposite the plurality of filters 30 with their respective lenses and formed as a reflecting surface 40a to reflect the light rays. The plurality of filters 30 with their respective lenses are arranged in a column in their alignment direction parallel to the reflecting surface 40a of the reflecting member 40.

In this embodiment, the optical elements 20 are configured as light emitting elements (laser diodes), and receive driving current provided from the driving element 14 and emit laser light. The optical elements 20 are electrically connected by a plurality of bonding wires 51 for optical element connection to the driving element 14.

The driving element 14 is electrically connected to first to fourth signal lines 61 to 64 of the wiring member 6 by a plurality of bonding wires 52 for line connection. The first to fourth signal lines 61 to 64 are each made of a differential signal line. The first to fourth signal lines 61 to 64 are connected with the bonding wires 52 in the casing member 11 at one end, and are connected to a circuit board not shown at the other end.

The wiring member 6 is formed with the first to fourth signal lines 61 to 64 on one main surface 60a of a substrate 60 made of an electrical insulator such as ceramic or the like and is formed with a planar ground pattern on the other substantially entire main surface 60b of the substrate 60. Further, on the one main surface 60a of the substrate 60, a power supply pattern 65 is formed to supply electric power to the driving element 14, and that power supply pattern 65 is electrically connected by a plurality of bonding wires 53 for power supply connection to the driving element 14. Incidentally, the substrate 60 may also be formed of a resin material having flexibility, such as polyimide or the like. In this case, the wiring member 6 is configured as a flexible substrate.

The base 13 is mounted with the plurality of optical elements 20, the plurality of filters 30 with their respective lenses, the one reflecting member 40, and the driving element 14 on a mounting surface 13a thereof. As a suitable material for the base 13, it is possible to use a ferrous metal excellent in electrical conductivity and thermal conductivity. Incidentally, the base 13 may be formed of an electrical insulator such as ceramic, resin, or the like. Also, the material for the base 13 made of an electrical insulator may be formed with an electrically conductive layer on the mounting side 13a thereof.

Furthermore, on the mounting surface 13a of the base 13 is connected the ground pattern of the wiring member 6 by a silver paste, for example. This results in electrical grounding of the mounting surface 13a. A plurality of bonding wires 54 for ground connection, which are connected to a ground electrode of the driving element 14 at their respective one ends, are connected to that mounting surface 13a at their respective other ends. The driving element 14 then provides the driving current to the plurality of optical elements 20 in response to electrical signals transmitted through the first to fourth signal lines 61 to 64, thereby allowing the plurality of optical elements 20 to emit their respective light rays. That driving current is the current signal produced by amplifying and converting the electric signals (voltage signals) transmitted through the first to fourth signal lines 61 to 64.

(Configuration of the Filter with its Lens)

FIG. 2A is a perspective view showing the filter 30 with its lens. FIG. 2B is a perspective view showing the filter 30 with its lens when viewed from the opposite side in FIG. 2A. FIG. 2C is a side view showing the filter 30 with its lens.

The filter 30 with its lens is formed with a mirror section 301 over a first side surface 300a of a translucent polyhedral base section 300, and is provided with a lens section 302 on a second side surface 300b different from the first side surface 300a formed with the mirror section 301 thereon. In this embodiment, the base section 300 is made of a rectangular hexahedral glass such as quartz glass, BK7 (borosilicate) optical glass or the like, and its second side surface 300b is the opposite surface to its first side surface 300a.

The mirror section 301 is configured as a multilayer film filter formed over the planar first side surface 300a, and it transmits a predetermined transmission band wavelength light ray while reflecting a predetermined reflection band wavelength light ray. The transmission band wavelength and the reflection band wavelength are different for each of the plurality of filters 30 with their respective lenses.

The lens section 302 has a convex spherical lens at its central portion relative to the second side surface 300b. The lens section 302 may be formed integrally with the base section 300, or may be formed separately from the base section 300 and bonded by an adhesive or the like to the second side surface 300b of the base section 300. That is, the filter 30 with its lens may be formed in such a manner that its mirror section 301 and its lens section 302 are formed integrally with the base section 300, with their relative locations fixed to each other. Incidentally, when the lens section 302 is formed separately and bonded to the base section 300 to constitute the filter 30 with its lens, the lens section 302 can be formed of a resin excellent for molding, such as acryl or the like.

The filter 30 with its lens is arranged with its lens section 302 opposite the optical elements 20. The filter 30 with its lens is also fixed to the base 13 at a lower surface 300e of the base section 300, and is located opposite an unillustrated lid of the casing member 11 at an upper surface 300f opposite the lower surface 300e. Also, a third side surface 300c and a fourth side surface 300d between the lower surface 300e and the upper surface 300f are surfaces to be gripped by a gripper at the time of assembling the filter 30 with its lens.

(Configuration of the Optical System)

Figure 3A:
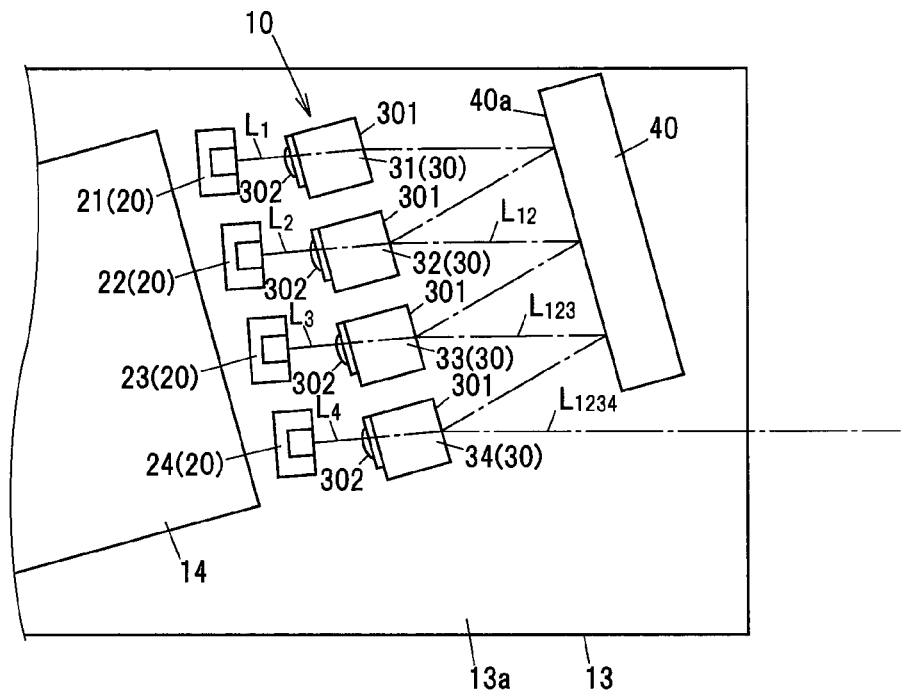
FIG. 3A is a plan view showing a configuration of an optical system.
Figure 3B:
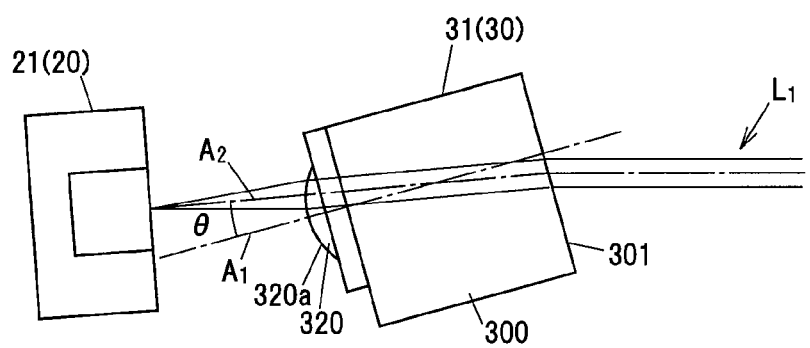
FIG. 3B is a partially enlarged view of FIG. 3A.

FIG. 3A is a plan view showing a configuration of the optical system 10. FIG. 3B is a partially enlarged view of FIG. 3A. In FIG. 3A, optical paths of signal light rays of the optical elements 20 are depicted as optical axes indicated by alternate long and short dash lines respectively, while no bonding wires 51 to 54 are shown. Here, the signal light rays refer to light rays to be controlled in response to a signal transmitted or received through the optical fiber used as a transmission medium.

Although the four filters 30 with their respective lenses are each configured in the same manner, when in the following description it is necessary to identify each of the filters 30 with their respective lenses, the four filters 30 with their respective lenses are referred to as the first to fourth filters 31 to 34 with their respective lenses, respectively. Similarly, when it is necessary to identify each of the four optical elements 20, the four optical elements 20 are referred to as the first to fourth optical elements 21 to 24, respectively.

The first to fourth filters 31 to 34 with their respective lenses are arranged in correspondence with the first to fourth optical elements 21 to 24 respectively. More specifically, the first filter 31 with its lens is arranged in correspondence with the first optical element 21, so that the signal light ray $L_1$ emitted from the first optical element 21 enters the lens section 302 of the first filter 31 with its lens. Similarly, the second filter 32 with its lens is arranged in correspondence with the second optical element 22, and the third filter 33 with its lens is arranged in correspondence with the third optical element 23. In addition, the fourth filter 34 with its lens is arranged in correspondence with the fourth optical element 24. The signal light rays $L_2$ to $L_4$ emitted from the second to fourth optical elements 22 to 24 enter the respective lens sections 302 of the second to fourth filters 32 to 34 with their respective lenses, respectively. The signal light rays $L_1$ to $L_4$ of the first to fourth optical elements 21 to 24 are optical signals converted from the electrical signals propagating through the first to fourth signal lines 61 to 64.

The light rays emitted from the first to fourth optical elements 21 to 24 toward the lens sections 302 are diffusive light rays, and these diffusive light rays are collimated by the lens sections 302, and converted into collimated light rays. The signal light rays $L_1$ to $L_4$ of the first to fourth optical elements 21 to 24 converted into the collimated light rays travel forward in the base sections 300, pass through the mirror sections 301 and exit from the first to fourth filters 31 to 34 with their respective lenses, respectively.

The first to fourth filters 31 to 34 with their respective lenses are arranged in a column in such a manner that their respective mirror sections 301 are parallel to the reflecting surface 40a of the reflecting member 40. The light rays transmitted through the respective mirror sections 301 of the first to third filters 31 to 33 with their respective lenses are reflected off the reflecting surface 40a of the reflecting member 40. The light ray transmitted through the mirror section 301 of the fourth filter 34 with its lens is passed through the light passing hole 111 of the casing member 11 as shown in FIG. 1, is transmitted through the optical isolator 15 and the lens 16, and passed into a core of the optical fiber 91.

The optical paths of the signal light rays $L_1$ to $L_4$ of the first to fourth optical elements 21 to 24 transmitted through the respective lens sections 302 of the first to fourth filters 31 to 34 with their respective lenses are tilted relative to the central axes of those lens sections 302. In FIG. 3B, the central axis $A_1$ of the lens section 302 of the first filter 31 with its lens is indicated by an alternate long and short dash line. Although the signal light ray $L_1$ of the first optical element 21 to be transmitted through that lens section 302 is wholly incident on the convex spherical lens surface 302a of that lens section 302, the central axis $A_2$ of the optical path of the signal light ray $L_1$ of the first optical element 21 is tilted relative to the central axis $A_1$ of that lens section 302. This tilt angle θ is, for example, 5 to 15 degrees. Similarly, the central axes of the optical paths of the signal light rays $L_2$ to $L_4$ of the second to fourth optical elements 22 to 24 are tilted relative to the central axes $A_1$ of their respective lens sections 302.

This configuration allows the light rays emitted from the respective mirror sections 301 of the first to third filters 31 to 33 with their respective lenses to travel forward in the direction tilted relative to those mirror sections 301, be reflected off the reflecting surface 40a of the reflecting member 40, and be incident on the mirror sections 301 of the other adjacent filters 30 with their respective lenses (i.e. the second to fourth filters 32 to 34 with their respective lenses), respectively.

Incidentally, although in this embodiment, the base section 300 is shaped in a rectangular cuboid with the first side surface 300a and the second side surface 300b being parallel to each other, when the base section 300 is shaped into a polyhedron with the first side surface 300a and the second side surface 300b being non-parallel, it is possible to align the central axes of the optical paths of the signal light rays $L_1$ to $L_4$ of the first to fourth optical elements 21 to 24 with the central axes $A_1$ of the lens sections 302, respectively. It should be noted, however, that shaping the base section 300 into a rectangular cuboid facilitates the fabrication of the first to fourth filters 31 to 34 with their respective lenses, allowing for contribution to cost lowering.

In this manner, the first to fourth filters 31 to 34 with their respective lenses are positioned and disposed in such a manner that the respective lens sections 302 thereof collimate the light rays emitted by the first to fourth optical elements 21 to 24, while the respective mirror sections 301 thereof multiplex the light rays emitted by the first to fourth optical elements 21 to 24. This allows the light rays transmitted through the respective mirror sections 301 of the first to third filters 31 to 33 with their respective lenses to be reflected off the reflecting surface 40a of the reflecting member 40, and be incident on the mirror sections 301 of the other adjacent filters 30 with their respective lenses (i.e. the second to fourth filters 32 to 34 with their respective lenses), respectively, in the optical system 10 in such a manner that the signal light rays of the first to fourth optical elements 21 to 24 are superimposed on top of each other. Operation of the optical system 10 will more specifically be described below.

(Operation of the Optical System)

The signal light ray $L_1$ of the first optical element 21 is passed into the lens section 302 of the first filter 31 with its lens, converted into a collimated light ray, and transmitted through the mirror section 301 of the first filter 31 with its lens. The signal light ray $L_1$ of the first optical element 21 transmitted through the mirror section 301 of the first filter 31 with its lens is reflected off the reflecting surface 40a of the reflecting member 40, and travels forward toward the mirror section 301 of the second filter 32 with its lens.

The signal light ray $L_2$ of the second optical element 22 is passed into the lens section 302 of the second filter 32 with its lens, converted into a collimated light ray, and transmitted through the mirror section 301 of the second filter 32 with its lens. Further, the signal light ray $L_1$ of the first optical element 21 reflected off the reflecting surface 40a of the reflecting member 40 is reflected off the mirror section 301 of the second filter 32 with its lens. That is, the mirror section 301 of the second filter 32 with its lens has the property of reflecting light of the wavelength of the signal light ray $L_1$ of the first optical element 21, while transmitting light of the wavelength of the signal light ray $L_2$ of the second optical element 22.

The signal light ray $L_2$ of the second optical element 22 transmitted through the mirror section 301 of the second filter 32 with its lens is superimposed on the signal light ray $L_1$ of the first optical element 21 reflected off the mirror section 301 of the second filter 32 with its lens, and travels forward toward the reflecting surface 40a of the reflecting member 40. The reflecting member 40 reflects a superimposed light ray $L_{12}$ composed of the signal light rays $L_1$ and $L_2$ of the first and second optical elements 21 and 22 superimposed together toward the mirror section 301 of the third filter 33 with its lens.

The signal light ray $L_3$ of the third optical element 23 is passed into the lens section 302 of the third filter 33 with its lens, converted into a collimated light ray, and transmitted through the mirror section 301 of the third filter 33 with its lens. In addition, the superimposed light ray $L_{12}$ reflected off the reflecting surface 40a of the reflecting member 40 is reflected off the mirror section 301 of the third filter 33 with its lens. That is, the mirror section 301 of the third filter 33 with its lens has the property of reflecting light of the wavelengths of the signal light rays $L_1$ and $L_2$ of the first and second optical elements 21 and 22, while transmitting light of the wavelength of the signal light ray $L_3$ of the third optical element 23.

The signal light ray $L_3$ of the third optical element 23 transmitted through the mirror section 301 of the third filter 33 with its lens is superimposed on the superimposed light ray $L_{12}$ reflected off the mirror section 301 of the third filter 33 with its lens, and travels forward toward the reflecting surface 40a of the reflecting member 40. The reflecting member 40 reflects a superimposed light ray $L_{123}$ composed of the signal light rays $L_1$, $L_2$, and $L_3$ of the first, second, and third optical elements 21, 22, and 23 superimposed together toward the mirror section 301 of the fourth filter 34 with its lens.

The signal light ray $L_4$ of the fourth optical element 24 is passed into the lens section 302 of the fourth filter 34 with its lens, converted into a collimated light ray, and transmitted through the mirror section 301 of the fourth filter 34 with its lens. In addition, the superimposed light ray $L_{123}$ reflected off the reflecting surface 40a of the reflecting member 40 is reflected off the mirror section 301 of the fourth filter 34 with its lens. That is, the mirror section 301 of the fourth filter 34 with its lens has the property of reflecting light of the wavelengths of the signal light rays $L_1$, $L_2$, and $L_3$ of the first, second, and third optical elements 21, 22, and 23, while transmitting light of the wavelength of the signal light ray $L_4$ of the fourth optical element 24.

The signal light ray $L_4$ of the fourth optical element 24 transmitted through the mirror section 301 of the fourth filter 34 with its lens is superimposed on the superimposed light ray $L_{123}$ reflected off the mirror section 301 of the fourth filter 34 with its lens to form a superimposed light ray $L_{1234}$, and travels forward toward the light passing hole 111 of the casing member 11 (as shown in FIG. 1). The superimposed light ray $L_{1234}$ is then transmitted through the optical isolator 15 and the lens 16 and passed into the core of the optical fiber 91. The superimposed light ray $L_{1234}$ is a WDM (Wavelength Division Multiplexed) optical signal to perform wavelength division multiplexed communication using the optical fiber 91 as a signal transmission medium.

(Method of Producing the Optical Module)

Referring next to FIGS. 4 to 7, a method for producing the optical module 1 is described. Herein, in particular, an assembling procedure for the optical system 10 is described.

The assembling of the optical system 10 is performed at the final stage of the producing process for the optical module 1. Incidentally, the assembling of portions other than the optical system 10 in the optical module 1 can be performed by a well known method.

Figure 4:
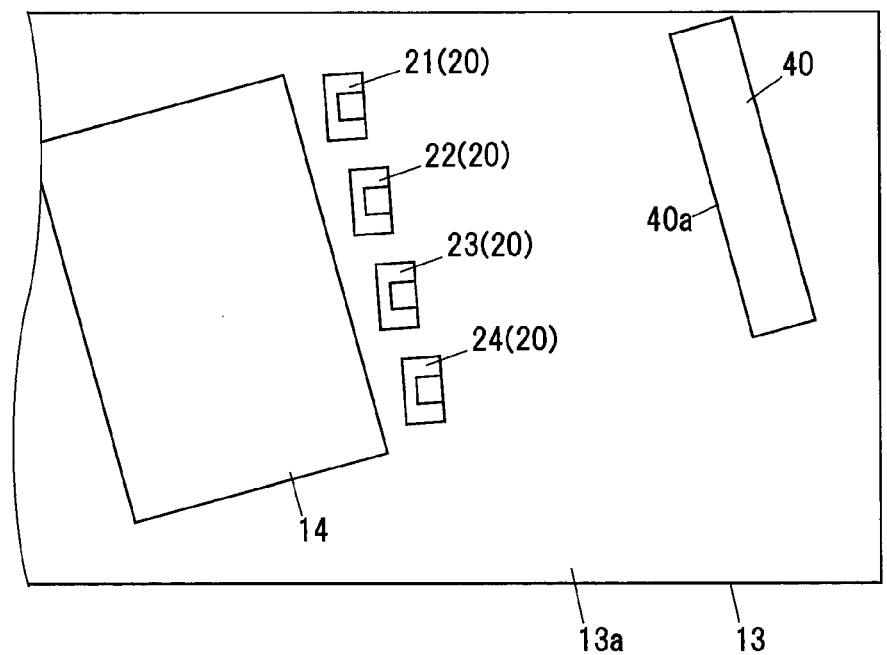
FIG. 4 is a plan view showing a base before assembling the optical system, and a plurality of optical elements, a reflecting member, and a driving element mounted on the base.

FIG. 4 is a plan view showing the base 13 before assembling the optical system 10, and the first to fourth optical elements 21 to 24, the reflecting member 40, and the driving element 14 mounted on the mounting surface 13a of the base 13.

Assembling the optical system 10 is performed after the first to fourth optical elements 21 to 24, the reflecting member 40, and the driving element 14 are arranged and fixed at predetermined locations on the mounting surface 13a of the base 13, and the electrode of the driving element 14 is connected to each portion by the bonding wires 51 to 54. Incidentally, in FIGS. 4 to 7, the bonding wires 51 to 54 and the wiring member 6 are not shown.

In the assembling process for the optical system 10, the fourth filter 34 with its lens to transmit the signal light ray $L_4$ of the fourth optical element 24 to be last superimposed in the process of generating the WDM optical signal to be passed into the optical fiber 91 is first assembled, and then the third filter 33 with its lens, the second filter 32 with its lens, and the first filter 31 with its lens are in turn assembled.

The assembling procedure for these first to fourth filters 31 to 34 with their respective lenses is described step by step below.

Figure 5:
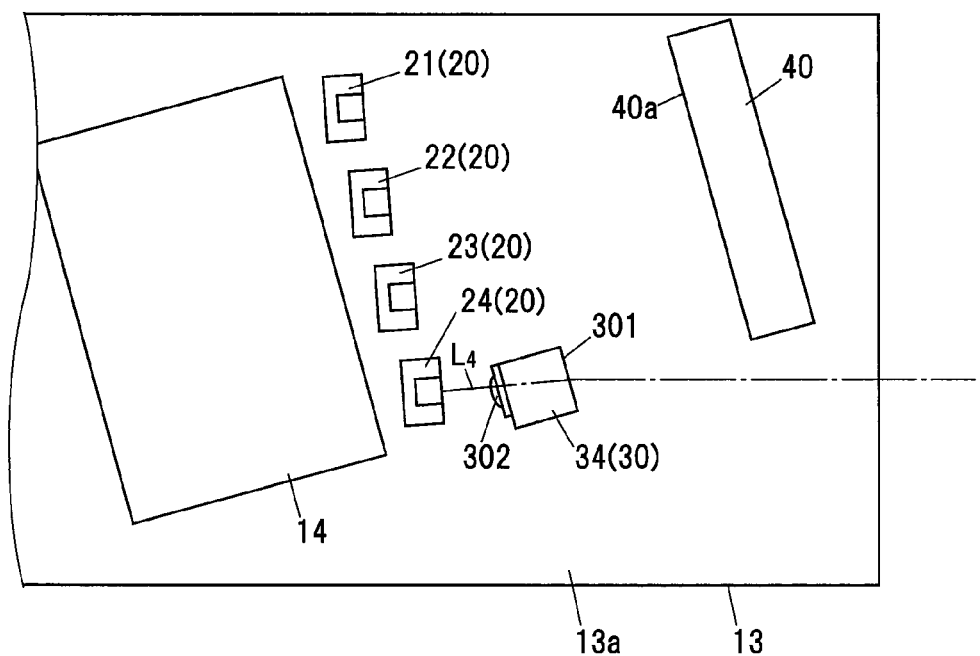
FIG. 5 is an explanatory view showing the step of assembling a fourth filter with its lens.

FIG. 5 is an explanatory view showing the step of assembling the fourth filter 34 with its lens. In this step, the fourth filter 34 with its lens is positioned and fixed in such a manner that the signal light ray $L_4$ emitted by the fourth optical element 24 is passed into the core of the optical fiber 91. In the assembling of the fourth filter 34 with its lens, an ultraviolet curable adhesive is pre-coated over a mounting area for the fourth filter 34 with its lens on the mounting surface 13a of the base 13, and the base section 300 of the fourth filter 34 with its lens is gripped by a gripper, positioned, and followed by ultraviolet irradiation to solidify the ultraviolet curable adhesive.

The fourth filter 34 with its lens is positioned with its mirror section 301 maintained parallel to the reflecting surface 40a of the reflecting member 40 in such a manner as to maximize the intensity of the signal light ray $L_4$ of the fourth optical element 24 emitted from the core at the other end of the optical fiber 91. At this point, the location of the fourth filter 34 with its lens is adjusted in a direction parallel to the mounting surface 13a of the base 13, and in a direction perpendicular to that mounting surface 13a. The adjustment of the location of the fourth filter 34 with its lens may be performed manually by a user, or may be performed by a moving mount or an aligning device, which is movable in three orthogonal axial directions.

Figure 6:
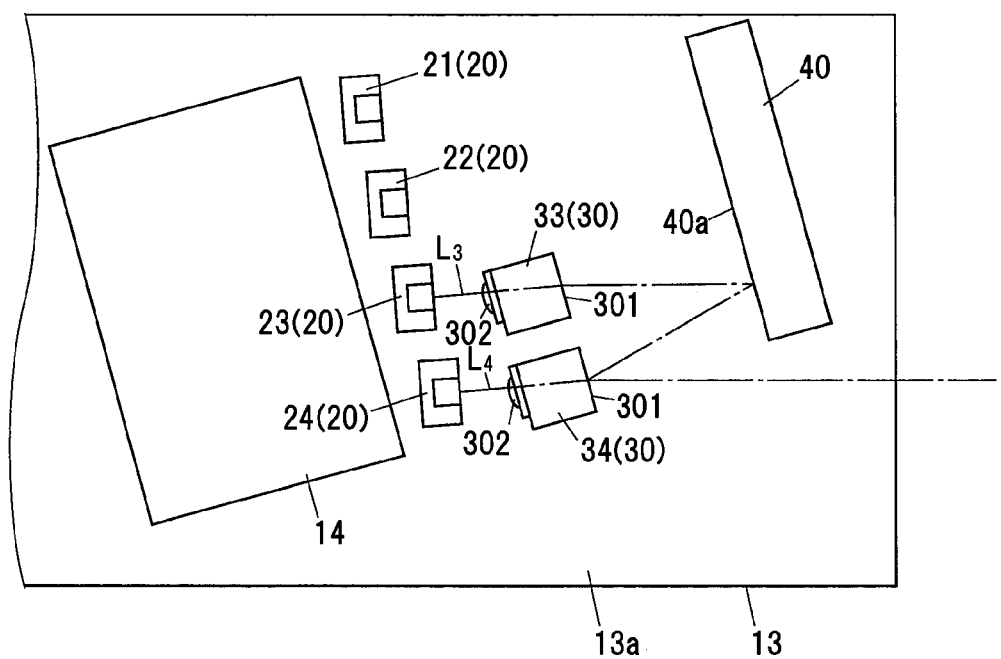
FIG. 6 is an explanatory view showing the step of assembling a third filter with its lens.

FIG. 6 is an explanatory view showing the step of assembling of the third filter 33 with its lens. The assembling of the third filter 33 with its lens is performed after the fixing of the fourth filter 34 with its lens.

In the assembling of the third filter 33 with its lens, the third filter 33 with its lens is positioned and fixed in such a manner that the signal light ray $L_3$ emitted by the third optical element 23 is reflected off the reflecting surface 40a of the reflecting member 40 and the mirror section 301 of the fourth filter 34 with its lens and passed into the core of the optical fiber 91.

The third filter 33 with its lens is positioned with its mirror section 301 maintained parallel to the reflecting surface 40a of the reflecting member 40 in such a manner as to maximize the intensity of the signal light ray $L_3$ of the third optical element 23 emitted from the core at the other end of the optical fiber 91. As with the fourth filter 34 with its lens, the third filter 33 with its lens is fixed after positioning and by ultraviolet curable adhesive solidification.

Figure 7:
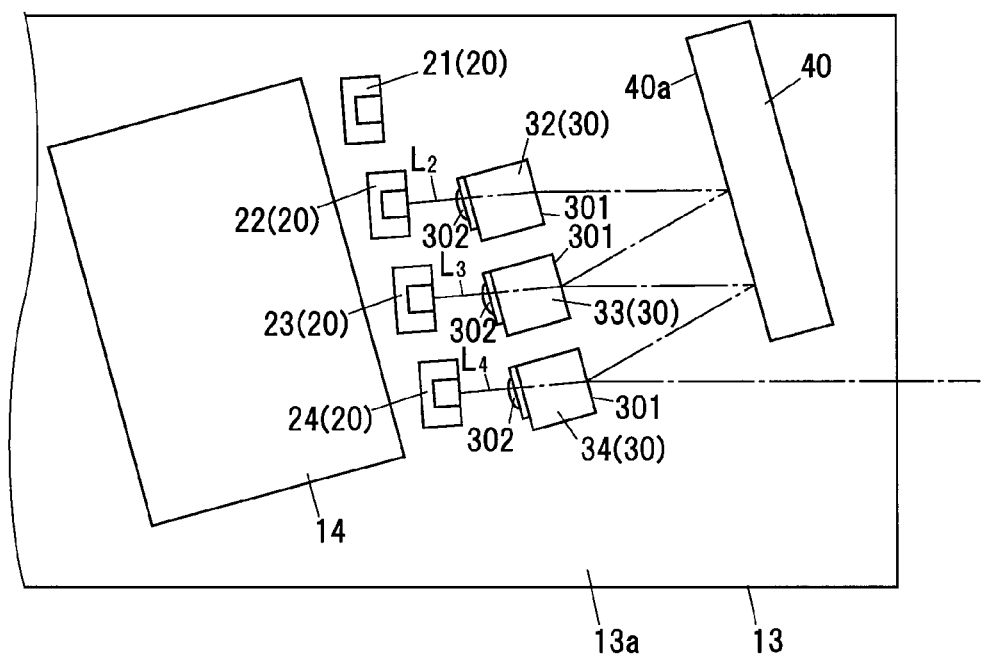
FIG. 7 is an explanatory view showing the step of assembling a second filter with its lens.

FIG. 7 is an explanatory view showing the step of assembling of the second filter 32 with its lens. The assembling of the second filter 32 with its lens is performed after the fixing of the third filter 33 with its lens.

In the assembling of the second filter 32 with its lens, the second filter 32 with its lens is positioned and fixed in such a manner that the signal light ray $L_2$ emitted by the second optical element 22 is reflected, in turn, off the reflecting surface 40a of the reflecting member 40, the mirror section 301 of the third filter 33 with its lens, the reflecting surface 40a of the reflecting member 40, and the mirror section 301 of the fourth filter 34 with its lens, and is passed into the core of the optical fiber 91.

The second filter 32 with its lens is positioned with its mirror section 301 maintained parallel to the reflecting surface 40a of the reflecting member 40 in such a manner as to maximize the intensity of the signal light ray $L_2$ of the second optical element 22 emitted from the core at the other end of the optical fiber 91. As with the third and fourth filters 33 and 34 with their respective lenses, the second filter 32 with its lens is fixed after positioning and by ultraviolet curable adhesive solidification. Then, the fixing of the fourth to second filters 34 to 32 with their respective lenses is followed by assembling the first filter 31 with its lens.

In the assembling of the first filter 31 with its lens, the first filter 31 with its lens is positioned and fixed in such a manner that the signal light ray $L_1$ emitted by the first optical element 21 is reflected, in turn, off the reflecting surface 40*a* of the reflecting member 40, the mirror section 301 of the second filter 32 with its lens, the reflecting surface 40*a* of the reflecting member 40, the mirror section 301 of the third filter 33 with its lens, the reflecting surface 40*a* of the reflecting member 40, and the mirror section 301 of the fourth filter 34 with its lens, and is passed into the core of the optical fiber 91.

The first filter 31 with its lens is positioned with its mirror section 301 maintained parallel to the reflecting surface 40*a* of the reflecting member 40 in such a manner as to maximize the intensity of the signal light ray $L_1$ of the first optical element 21 emitted from the core at the other end of the optical fiber 91. As with the fourth to second filters 34 to 32 with their respective lenses, the first filter 31 with its lens is fixed after positioning and by ultraviolet curable adhesive solidification.

In each step above, the first to fourth filters 31 to 34 with their respective lenses are assembled as shown in FIG. 3A, constituting the optical system 10.

(Functions and Advantageous Effects of the First Embodiment)

The above described first embodiment has the following functions and advantageous effects.

(1) Since the filters 30 with their respective lenses (the first to fourth filters 31 to 34 with their respective lenses) are each configured as one component including its mirror section 301 and its lens section 302, it is possible to reduce the number of components to constitute the optical system 10, and also enhance productivity. That is, if an optical system is configured, including mirrors and lenses as separate members in place of the filters 30 with their respective lenses, the number of components is large, and the number of man-hours required to position and fix each of those members is large, thus leading to productivity lowering, whereas the present embodiment uses the filters 30 with their respective lenses including their respective mirror sections 301 and their respective lens sections 302, thereby reducing the number of components and the number of man-hours.

(2) Since the filters 30 with their respective lenses is formed with their respective mirror sections 301 over the first side surfaces 300*a* of the translucent polyhedral base sections 300 and is provided with their respective lens sections 302 on the second side surfaces 300*b* of the translucent polyhedral base sections 300, when the filters 30 with their respective lenses (the first to fourth filters 31 to 34 with their respective lenses) are positioned, it is possible to adjust their locations by gripping the base sections 300. Also, since the filters 30 with their respective lenses are fixed by the adhesive to the mounting surface 13*a* of the base 13 at the lower surfaces 300*e* of the base sections 300, the filters 30 with their respective lenses can securely be fixed to the base 13.

(3) Since in the present embodiment, the base sections 300 are in the rectangular cuboid, production thereof is easy. Moreover, since the optical paths of the signal light rays $L_1$ to $L_4$ of the first to fourth optical elements 21 to 24 are tilted relative to the central axes of the lens sections 302, the signal light rays $L_1$ to $L_4$ of the first to fourth optical elements 21 to 24 are emitted in the direction tilted relative to the mirror sections 301, are reflected off the reflecting surface 40*a* of the reflecting member 40 and are incident on the mirror sections 301 of the adjacent filters 30 with their respective lenses respectively. This allows the signal light rays $L_1$ to $L_4$ of the first to fourth optical elements 21 to 24 to be, in turn, superimposed on top of each other, and thereby generate a WDM optical signal, as described with reference to FIG. 3A.

(4) Since the first to fourth filters 31 to 34 with their respective lenses are positioned in such a manner that their respective mirror sections 301 are parallel to the reflecting surface 40*a* of the reflecting member 40, the signal light rays $L_1$ to $L_4$ of the first to fourth optical elements 21 to 24 can be superimposed together with good accuracy. That is, the respective mirror sections 301 of the first to fourth filters 31 to 34 with their respective lenses are located on one virtual plane parallel to the reflecting surface 40*a* of the reflecting member 40, and, for example the first filter 31 with its lens is positioned in such a manner that the signal light ray $L_1$ of the first optical element 21 transmitted through the mirror section 301 of the first filter 31 with its lens and reflected off the reflecting surface 40*a* of the reflecting member 40, and the signal light ray $L_2$ of the second optical element 22 transmitted through the mirror section 301 of the second filter 32 with its lens are superimposed together, thereby resulting in superimposition, in turn, on the signal light rays $L_3$ and $L_4$ of the third and fourth optical elements 23 and 24 at the time of subsequent reflection off the respective mirror sections 301 of the third and fourth filters 33 and 34 with their respective lenses, to generate a WDM optical signal. That is, in this embodiment, the locational and angular degrees of freedom of the first to fourth filters 31 to 34 with their respective lenses are deliberately restricted in such a manner that their respective mirror sections 301 are parallel to the reflecting surface 40*a* of the reflecting member 40, thereby facilitating the positioning of the first to fourth filters 31 to 34 with their respective lenses.

[Second Embodiment]

Next, a second embodiment of the present invention will be described with reference to FIGS. 8 to 10. An optical module in the second embodiment differs in configuration of its optical system on the base 13 and its peripheral portion from the optical module 1 in the first embodiment, but its other portions are configured in the same manner as in the optical module 1 in the first embodiment.

Figure 8:
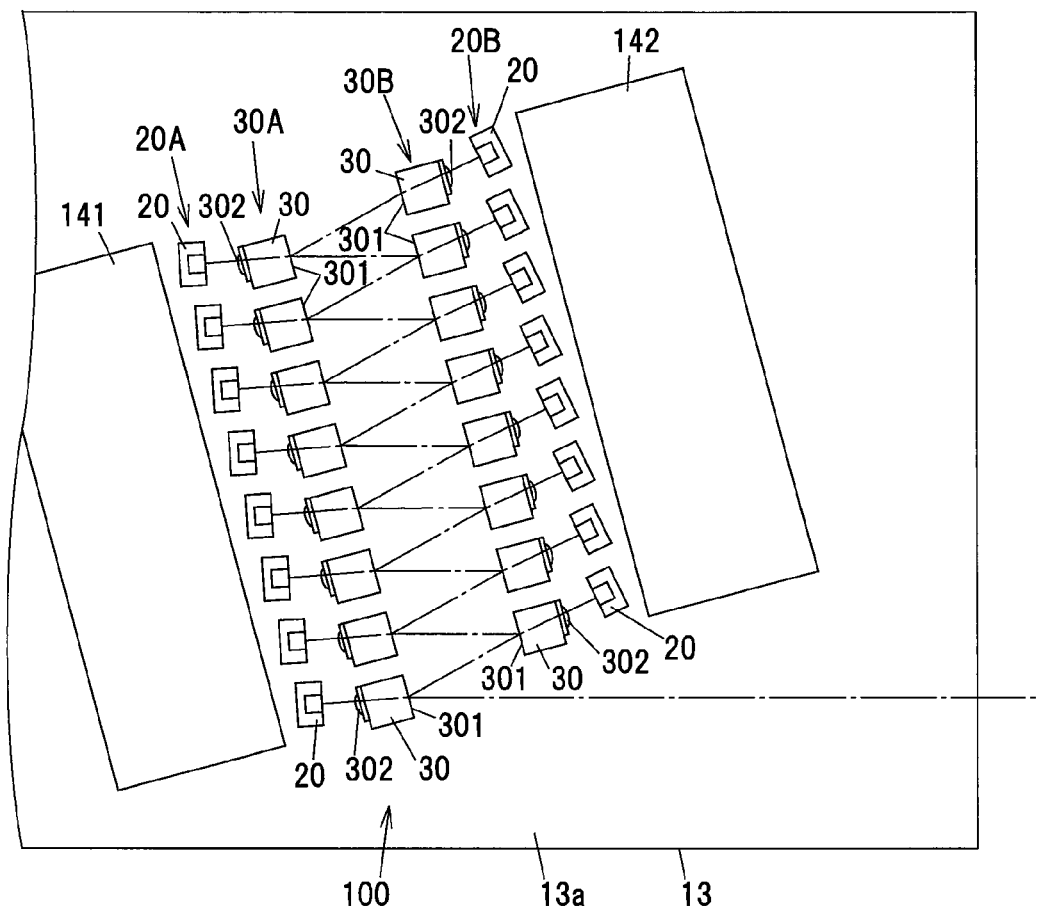
FIG. 8 is a plan view showing an optical system in a second embodiment of the present invention.

FIG. 8 is a plan view showing an optical system 100 in the second embodiment. In the second embodiment, a plurality of filters 30 with their respective lenses are arranged in double columns in such a manner that their respective mirror sections 301 face each other, and a plurality of optical elements 20 are arranged in double columns in such a manner as to be located opposite the respective lens sections 302 of the filters 30 with their respective lenses respectively arranged in the double columns.

The plurality of optical elements 20 are configured in such a manner as to emit their respective light rays having wavelengths different from each other toward the corresponding respective lens sections 302 of the filters 30 with their respective lenses. Then, the light rays transmitted through the respective mirror sections 301 of filters 30 with their respective lenses in one column of the plurality of filters 30 with their respective lenses disposed in the double columns are reflected off the respective mirror sections 301 of filters 30 with their respective lenses in the other column, to thereby, in turn, superimpose the signal light rays of the plurality of optical elements 20 on top of each other.

The optical system 100 in the second embodiment includes the sixteen optical elements 20, and the corresponding sixteen filters 30 with their respective lenses. The sixteen optical elements 20 constitute a first optical element column 20A and a second optical element column 20B each composed of their respective eight optical elements 20, and the sixteen filters 30 with their respective lenses are arranged in the double columns between the eight optical elements 20 of the first optical element column 20A and the eight optical elements 20 of the second optical element column 20B. The eight optical elements 20 of the first optical element column 20A are provided with a driving current from a first driving element 141 via unillustrated bonding wires to emit their respective light rays, while the eight optical elements 20 of the second optical element column 20B are provided with a driving current from a second driving element 142 via unillustrated bonding wires to emit their respective light rays.

The sixteen filters 30 with their respective lenses constitute a first filter column 30A and a second filter column 30B each composed of their respective eight filters 30 with their respective lenses. The eight filters 30 with their respective lenses of the first filter column 30A are arranged in correspondence with the eight optical elements 20, respectively, of the first optical element column 20A, while the eight filters 30 with their respective lenses of the second filter column 30B are arranged in correspondence with the eight optical elements 20, respectively, of the second optical element column 20B.

The respective mirror sections 301 of the eight filters 30 with their respective lenses of the first filter column 30A and the respective mirror sections 301 of the eight filters 30 with their respective lenses of the second filter column 30B are parallel to each other. Also, as with the first embodiment, the optical paths of the signal light rays of the optical elements 20 are tilted relative to the central axes of the lens sections 302. Furthermore, the mirror section 301 of each of the plurality of filters 30 with their respective lenses is designed to transmit a signal light ray of one corresponding optical element 20, while reflecting signal light rays of the other optical elements 20. This allows the signal light rays of the optical elements 20 to be, in turn, superimposed on top of each other by reflection off the respective mirror sections 301 of the filters 30 with their respective lenses. Then, at the filter 30 with its lens at one end of the first filter column 30A, all the signal light rays of the sixteen optical elements 20 are finally superimposed together, and the resulting superimposed light rays are passed into the core of the optical fiber as a WDM optical signal.

The assembling of the optical system 100 is performed after the sixteen optical elements 20 and the first and second driving elements 141 and 142 are arranged and fixed at predetermined locations respectively on the mounting surface 13a of the base 13, and the first and second driving elements 141 and 142 and each of the optical elements 20 are electrically connected together with unillustrated bonding wires so that each of the optical elements 20 is able to emit its light ray.

In addition, the assembling of the optical system 100 is performed similarly to the assembling of the optical system 10 in the first embodiment, by first assembling the filter 30 with its lens which transmits the signal light ray of the optical element 20 to be last superimposed in the process of generating the WDM optical signal, and then assembling the other filters 30 with their respective lenses in reverse signal light ray superimposition order.

Figure 9:
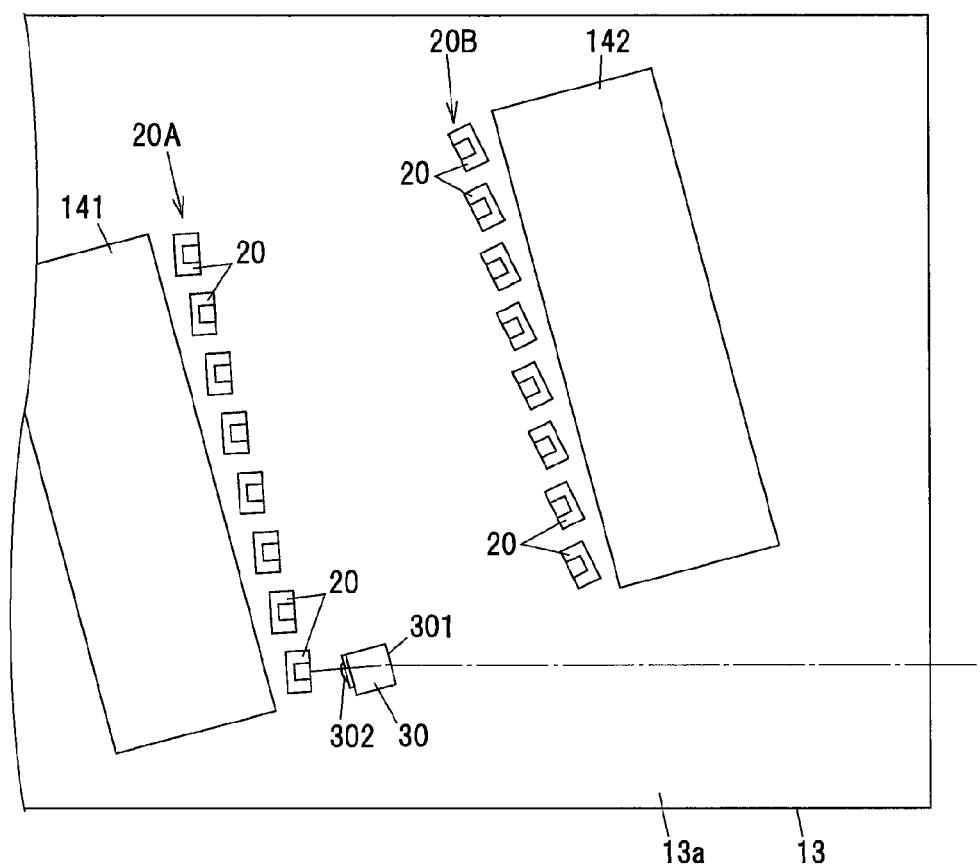
FIG. 9 is a plan view showing a plurality of optical elements, a first driving element and a second driving element mounted on a mounting surface of a base, and one filter with its lens to be first assembled.

FIG. 9 is a plan view showing the plurality of optical elements 20 and the first and second driving elements 141 and 142 mounted on the mounting surface 13a of the base 13, and one filter 30 with its lens first assembled on the base 13. FIG. 10 is a plan view showing a filter 30 with its lens second assembled, in addition to the illustrated contents of FIG. 9, in addition to the illustrated contents of FIG. 9.

The filter 30 with its lens first assembled shown in FIG. 9 belongs to the first filter column 30A, and is positioned with its mirror section 301 parallel to the alignment direction of the plurality of optical elements 20 in the first optical element column 20A and the second optical element column 20B, and at such a location that the signal light ray of the corresponding optical element 20 is passed into the core of the optical fiber. That filter 30 with its lens first assembled is fixed there with an ultraviolet curable adhesive, for example.

Figure 10:
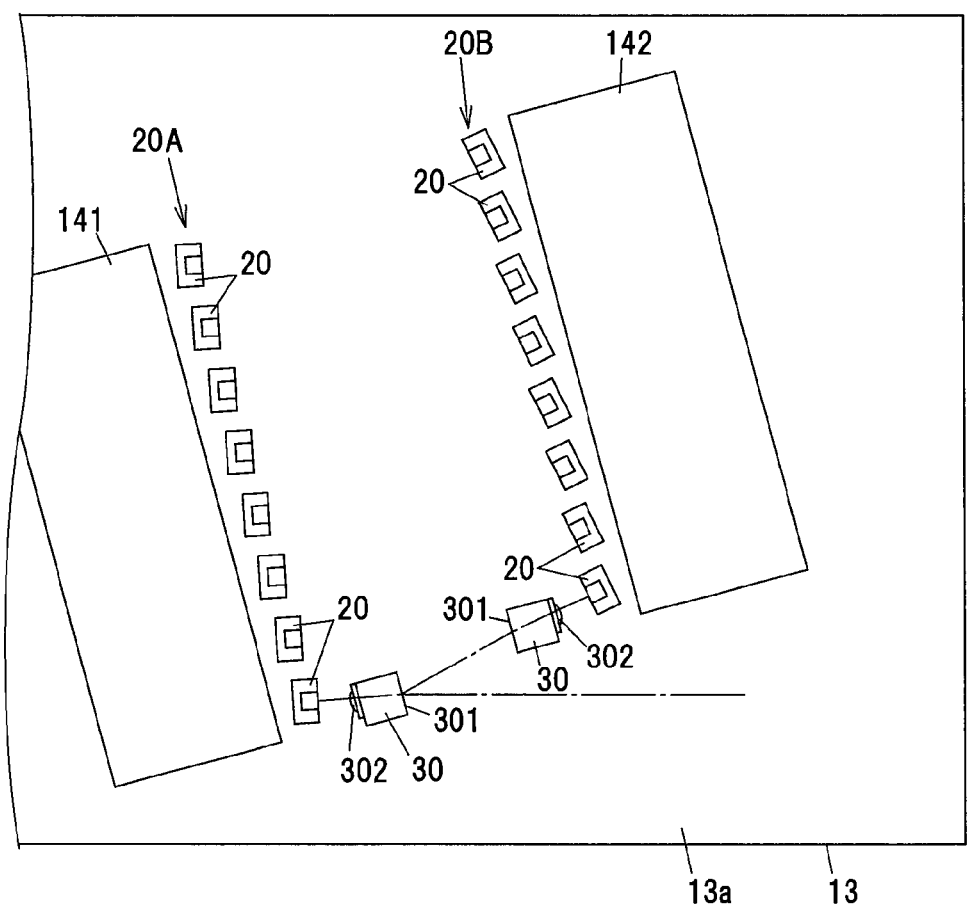
FIG. 10 is a plan view showing a filter with its lens to be second assembled in addition to the illustrated contents of FIG. 9.

The filter 30 with its lens second assembled, as shown in FIG. 10, is positioned with its mirror section 301 parallel to the mirror section 301 of the filter 30 with its lens first assembled, and at such a location that the signal light ray of the corresponding optical element 20 is reflected off the mirror section 301 of the filter 30 with its lens first assembled, and is passed into the core of the optical fiber. The filter 30 with its lens second assembled belongs to the second filter column 30B, and is disposed at one end of the second filter column 30B.

Subsequently, the remaining plurality of filters 30 with their respective lenses in the first filter column 30A and the remaining plurality of filters 30 with their respective lenses in the second filter column 30B are, in turn, alternately assembled, thereby constituting the optical system 100. The light ray transmitted through the mirror section 301 of the filter 30 with its lens at the other end of the second filter column 30B to be last assembled is reflected, in turn, off the respective mirror sections 301 of the other fifteen filters 30 with their respective lenses, and passed into the core of the optical fiber. That is, the WDM optical signal in the second embodiment is an optical signal to perform sixteen wavelength division multiplexed communication.

(Functions and Advantageous Effects of the Second Embodiment)

The above described second embodiment has the same functions and advantageous effects as the functions and advantageous effects of the first embodiment, and in addition, because the plurality of optical elements 20 and the plurality of filters 30 with their respective lenses are arranged in the double columns, and the signal light rays of the optical elements 20 are superposed on top of each other by reflection off the respective mirror sections 301 of the plurality of filters 30 with their respective lenses disposed in the double columns, it is possible to suppress the increase in the size of the base 13, but superimpose more light signals together.

[Third Embodiment]

Next, a third embodiment of the present invention will be described. An optical module in the third embodiment differs in function from the optical module in the first embodiment in that it is used in optical signal reception, but that optical module in the third embodiment is configured, including its constituent components in correspondence with the constituent components, respectively, of the optical module in the first embodiment. Therefore, its description will be given below with the aid of FIGS. 1 to 7 referred to in the description of the first embodiment.

In the optical module 1 in the third embodiment, the optical elements 20 are configured as light receiving elements (photodiodes) in which the optical elements 20 receive light and convert it into an electric signal, and that electric signal is amplified by the amplifying element 14, and transmitted in the first to fourth signal lines 61 to 64 of the wiring member 6. The optical system 10 demultiplexes a WDM optical signal emitted from the optical fiber 91 for each wavelength band, emits demultiplexed signal light rays from the lens sections 302 respectively, and receives those signal light rays in the plurality of optical elements 20 respectively.

In other words, the optical system 10 in the third embodiment includes the plurality of filters 30 with their respective lenses arranged in correspondence to the plurality of optical elements 20 respectively, and the plurality of filters 30 with their respective lenses are positioned and disposed in such a manner that their respective lens sections 302 converge light rays to be received by the optical elements 20 respectively, while their respective mirror sections 301 demultiplex the light rays to be received by the plurality of optical elements 20 respectively. This allows the plurality of optical elements 20 to receive the light rays having wavelengths different from each other.

Next, operation of the optical system 10 in the optical module 1 in the third embodiment will be described with reference to FIGS. 3A and 3B. In the optical system 10 in the third embodiment, the traveling of light is in the opposite direction to the traveling of light in the first embodiment, but the path of light is the same as the path of light in the first embodiment. In the third embodiment, light to be emitted from the optical fiber 91 is a four wavelength division multiplexed optical signal (wavelength division multiplexed light ray) resulting from multiplexing of the first to fourth demultiplexed signal light rays $L_1$ to $L_4$ to be received by the plurality of optical elements 20 (first to fourth optical elements 21 to 24) respectively.

The WDM optical signal emitted from the optical fiber 91 is incident on the mirror section 301 of the fourth filter 34 with its lens. The mirror section 301 of the fourth filter 34 with its lens has the property of transmitting a fourth demultiplexed signal light ray $L_4$ to be received by the fourth optical element 24, while reflecting light of wavelengths of first, second, and third demultiplexed signal light rays $L_1$, $L_2$, and $L_3$ to be received by the first, second, and third optical elements 21, 22, and 23. The fourth demultiplexed signal light ray $L_4$ transmitted through the mirror section 301 of the fourth filter 34 with its lens is converged by the lens section 302 of the fourth filter 34 with its lens, and received by the fourth optical element 24.

A superimposed light ray $L_{123}$ (an optical signal composed of the superimposed first, second, and third demultiplexed signal light rays $L_1$, $L_2$, and $L_3$) reflected off the mirror section 301 of the fourth filter 34 with its lens is reflected again off the reflecting surface 40a of the reflecting member 40, and is incident on the mirror section 301 of the third filter 33 with its lens. The mirror section 301 of the third filter 33 with its lens has the property of transmitting the third demultiplexed signal light ray $L_3$ to be received by the third optical element 23, while reflecting light of the wavelengths of the first and second demultiplexed signal light rays $L_1$ and $L_2$ to be received by the first and second optical elements 21 and 22. The third demultiplexed signal light ray $L_3$ transmitted through the mirror section 301 of the third filter 33 with its lens is converged by the lens section 302 of the third filter 33 with its lens, and received by the third optical element 23.

A superimposed light ray $L_{12}$ (an optical signal composed of the superimposed first and second demultiplexed signal light rays $L_1$ and $L_2$) reflected off the mirror section 301 of the third filter 33 with its lens is reflected again off the reflecting surface 40a of the reflecting member 40, and is incident on the mirror section 301 of the second filter 32 with its lens. The mirror section 301 of the second filter 32 with its lens has the property of transmitting the second demultiplexed signal light ray $L_2$ to be received by the second optical element 22, while reflecting light of the wavelength of the first demultiplexed signal light ray $L_1$ to be received by the first optical element 21. The second demultiplexed signal light ray $L_2$ transmitted through the mirror section 301 of the second filter 32 with its lens is converged by the lens section 302 of the second filter 32 with its lens, and received in the second optical element 22.

The first demultiplexed signal light ray $L_1$ reflected off the mirror section 301 of the second filter 32 with its lens is reflected again off the reflecting surface 40a of the reflecting member 40, and is incident on the mirror section 301 of the first filter 31 with its lens. The mirror section 301 of the first filter 31 with its lens transmits the first demultiplexed signal light ray $L_1$ to be received by the first optical element 21, and this first demultiplexed signal light ray $L_1$ is converged by the lens section 302 of the first filter 31 with its lens, and received in the first optical element 21.

In this manner, in the third embodiment, the light rays reflected off the mirror sections 301 of the adjacent filters 30 with their respective lenses (the second to fourth filters 32 to 34 with their respective lenses) respectively in the alignment direction excluding the first filter 31 with its lens and the reflecting surface 40a of the reflecting member 40 are, in turn, incident on the other adjacent filters 30 with their respective lenses (the first to third filters 31 to 33 with their respective lenses) respectively excluding the fourth filter 34 with its lens. Also, at the first to fourth filters 31 to 34 with their respective lenses, the central axes of the optical paths of the first to fourth demultiplexed signal light rays $L_1$ to $L_4$ to be passed through the lens sections 302 are tilted at an angle of e.g. 5 to 15 degrees relative to the central axes of the lens sections 302.

Next, a procedure for assembling the optical system 10 in the third embodiment will be described. In the same manner as in the first embodiment, this assembling is performed in such a manner that after the first to fourth optical elements 21 to 24, the reflecting member 40, and the amplifying element 14 are arranged and fixed at predetermined locations on the mounting surface 13a of the base 13, and the electrode of the amplifying element 14 is connected to each portion by the bonding wires 51 to 54, the fourth filter 34 with its lens, the third filter 33 with its lens, the second filter 32 with its lens, and the first filter 31 with its lens are, in turn, positioned and fixed in this order.

The fourth filter 34 with its lens, as shown in FIG. 5, is positioned with its mirror section 301 parallel to the reflecting surface 40a of the reflecting member 40, and at such a location that the fourth demultiplexed signal light ray $L_4$ of the WDM optical signal emitted from the optical fiber 91 is received by the fourth optical signal 24. The third filter 33 with its lens, as shown in FIG. 6, is positioned with its mirror section 301 parallel to the reflecting surface 40a of the reflecting member 40, and at such a location that the third demultiplexed signal light ray $L_3$ reflected off the mirror section 301 of the fourth filter 34 with its lens and the reflecting surface 40a of the reflecting member 40 and transmitted through the mirror section 301 of the third filter 33 with its lens is received by the third optical element 23.

Also, the second filter 32 with its lens, as shown in FIG. 7, is positioned with its mirror section 301 parallel to the reflecting surface 40a of the reflecting member 40, and at such a location that the second demultiplexed signal light ray $L_2$ reflected off the respective mirror sections 301 of the third and fourth filters 33 and 34 with their respective lenses and the reflecting surface 40a of the reflecting member 40 and transmitted through the mirror section 301 of the second filter 32 with its lens is received by the second optical element 22. Furthermore, the first filter 32 with its lens is positioned with its mirror section 301 parallel to the reflecting surface 40a of the reflecting member 40, and at such a location that the first demultiplexed signal light ray $L_1$ reflected off the respective mirror sections 301 of the second to fourth filters 32 to 34 with their respective lenses and the reflecting surface 40a of the reflecting member 40 and transmitted through the mirror section 301 of the first filter 31 with its lens is received by the first optical element 21.

Note that the first to fourth filters 31 to 34 with their respective lenses are fixed by, for example an ultraviolet curable adhesive, to the base 13, after positioning, in the same manner as in the first embodiment.

This allows the first to fourth filters 31 to 34 with their respective lenses to be assembled as shown in FIG. 3A, constituting the optical system 10. The third embodiment is also able to have the same functions and advantageous effects as the functions and advantageous effects as described for the first embodiment.

[Fourth Embodiment]

Next, a fourth embodiment of the present invention will be described. An optical module in the fourth embodiment differs in function from the optical module in the second embodiment in that it is used in optical signal reception, but that optical module in the fourth embodiment is configured, including its constituent components in correspondence with the constituent components, respectively, of the optical module in the second embodiment. Therefore, its description will be given below with the aid of FIGS. 8 to 10 referred to in the description of the second embodiment.

In the optical module in the fourth embodiment, the optical elements 20 are configured as light receiving elements (photodiodes) in which the optical elements 20 receive light and convert it into an electric signal, and that electric signal is amplified by first and second amplifying elements 141 and 142. The optical system 10 demultiplexes a WDM optical signal emitted from the optical fiber 91 for each wavelength band, emits demultiplexed signal light rays from the lens sections 302 respectively, and receives those signal light rays in the plurality of optical elements 20 respectively.

In the optical system 100 in the fourth embodiment, the traveling of light is in the opposite direction to the traveling of light in the second embodiment, but the path of light is the same as the path of light in the second embodiment. In other words, in the fourth embodiment, a wavelength division multiplexed light ray composed of a multiplicity of light rays having different wavelengths multiplexed therein is incident on the mirror section 301 of one of the plurality of filters 30 with their respective lenses disposed in the double columns, and light rays reflected off the respective mirror sections 301 of the filters 30 with their respective lenses in the opposite columns are incident on the other filters 30 with their respective lenses respectively. Then, the light rays transmitted to be dispersed through the respective mirror sections 301 of the filters 30 with their respective lenses, and converged by their respective lens sections 302 are passed, in turn, into the corresponding plurality of optical elements 20 respectively.

The assembling of the plurality of filters 30 with their respective lenses in the optical system 100 is performed by first assembling the filter 30 with its lens on which the WDM optical signal emitted from the optical fiber is incident, and second assembling the other filter 30 with its lens on which the light ray reflected off the mirror section 301 of that filter 30 with its lens is incident. Thereafter, the other filters 30 with their respective lenses are, in turn, assembled in the same order as the order in which the light rays reflected off their respective mirror sections 301 are incident thereon.

More specifically, the filter 30 with its lens on which the WDM optical signal emitted from the optical fiber is incident is positioned with its mirror section 301 parallel to the alignment direction of the plurality of optical elements 20 in the first optical element column 20A and the second optical element column 20B, and at such a location that the light ray transmitted through that mirror section 301 is received in the corresponding optical element 20. (See FIG. 9.) The filter 30 with its lens to be second assembled, as shown in FIG. 10, is positioned with its mirror section 301 parallel to the mirror section 301 of the filter 30 with its lens first assembled, and at such a location that the demultiplexed signal light ray is received in the corresponding optical element 20. Thereafter, the remaining filters 30 with their respective lenses are assembled by the same procedure.

The fourth embodiment is also able to have the same functions and advantageous effects as the functions and advantageous effects as described for the second embodiment.

(Summary of the embodiments)

Next, the technical concept that is ascertained from the embodiment described above will be described with the aid of the reference characters and the like in the embodiment. It should be noted, however, that each of the reference characters in the following description should not be construed as limiting the constituent elements in the claims to the members and the like specifically shown in the embodiment.

[1] An optical module (1), comprising:

a plurality of optical elements (20) to emit or receive light rays having wavelengths different from each other; and a plurality of optical members (filters 30 with their respective lenses) arranged in correspondence with the plurality of optical elements (20) respectively, the plurality of optical members (filters 30 with their respective lenses) each including a mirror section (301) to transmit a predetermined transmission band wavelength light ray while reflecting a predetermined reflection band wavelength light ray, and a lens section (302) located opposite the corresponding optical element, the plurality of optical members (filters 30 with their respective lenses) being positioned and disposed in such a manner that the respective lens sections (302) thereof collimate or converge the light rays to be emitted or received by the plurality of optical elements (20) respectively, while the respective mirror sections (301) thereof multiplex or demultiplex the light rays to be emitted or received by the plurality of optical elements (20) respectively.

[2] The optical module (1) according to [1] above, wherein the optical members (filters 30 with their respective lenses) each of which includes a translucent polyhedral base section (300) in such a manner that the respective mirror sections (301) thereof are formed on respective one side surfaces (first side surfaces 300a) of the respective polyhedral base sections (300) respectively, while the respective lens sections (302) thereof are provided on respective side surfaces (second side surfaces 300b) different from the respective one side surfaces (first side surfaces 300*a*) of the respective polyhedral base sections (300) with the respective mirror sections (301) formed thereon respectively.

[3] The optical module (1) according to [2] above, wherein the bases (300) of the optical members (filters 30 with their respective lenses) are in a rectangular cuboid shape in such a manner that the respective lens sections (302) thereof are provided on respective opposite side surfaces (second side surfaces 300*b*) to the respective one side surfaces (first side surfaces 300*a*) respectively, wherein central axes ($A_2$) of optical paths of the light rays transmitted through the lens sections (302) are tilted relative to central axes ($A_1$) of the lens sections (302) respectively.

[4] The optical module (1) according to any one of [1] to [3] above, wherein the plurality of optical elements (20) are light emitting elements that emit light rays having wavelengths different from each other, wherein the optical module (1) further includes a reflecting member (40) with a reflecting surface (40*a*) to reflect the light rays transmitted through the mirror sections (301) of other optical members (filters 30 with their respective lenses) excluding one of the plurality of optical members (filters 30 with their respective lenses), wherein the plurality of optical members (filters 30 with their respective lenses) are arranged in a column in such a manner that the respective mirror sections (301) thereof are parallel to the reflecting surface (40*a*) of the reflecting member (40), wherein the light rays transmitted through the mirror sections (301) of the other optical members (filters 30 with their respective lenses) are reflected off the reflecting surface (40*a*) of the reflecting member (40) and are incident on the mirror sections (301) of adjacent optical members (filters 30 with their respective lenses) respectively, in such a manner that the signal light rays of the plurality of optical elements (20) are superimposed on top of each other.

[5] The optical module (1) according to any one of [1] to [3] above, wherein the plurality of optical elements (20) are light receiving elements to receive a light ray and convert it into an electric signal, wherein the optical module (1) further includes a reflecting member (40) with a reflecting surface (40*a*) parallel to the mirror sections (301) of the plurality of optical members (filters 30 with their respective lenses), wherein the plurality of optical members (filters 30 with their respective lenses) are arranged in a column in an alignment direction parallel to the reflecting surface (40*a*) of the reflecting member (40), wherein a wavelength division multiplexed light ray composed of a multiplicity of light rays having different wavelengths multiplexed therein is incident on the mirror section of one of the plurality of optical members (filters 30 with their respective lenses), wherein the light rays reflected off the respective mirror sections (301) of the optical members (filters 30 with their respective lenses) and the reflecting surface (40*a*) of the reflecting member (40) are, in turn, incident on other adjacent optical members (filters 30 with their respective lenses) respectively in the alignment direction, excluding the one of the plurality of optical members (filters 30 with their respective lenses).

[6] The optical module (1) according to any one of [1] to [3] above, wherein the plurality of optical members (filters 30 with their respective lenses) are arranged in double columns in such a manner that the respective mirror sections (301) thereof face each other, wherein the plurality of optical elements (20) are arranged in double columns in such a manner as to be located opposite the respective lens sections (302) of the optical members (filters 30 with their respective lenses) arranged in the double columns respectively, and the plurality of optical elements (20) emit the light rays having wavelengths different from each other toward the lens sections (302) respectively, wherein the light rays transmitted through the mirror sections (301) of optical members (filters 30 with their respective lenses) in one column of the plurality of optical members (filters 30 with their respective lenses) disposed in the double columns are reflected off the mirror sections (301) of optical members (filters 30 with their respective lenses) in an other column, in such a manner that the signal light rays of the plurality of optical elements (20) are, in turn, superimposed on top of each other.

[7] The optical module (1) according to any one of [1] to [3] above, wherein the plurality of optical members (filters 30 with their respective lenses) are arranged in double columns in such a manner that the respective mirror sections (301) thereof face each other, wherein the plurality of optical elements (20) are arranged in double columns in such a manner as to be located opposite the respective lens sections (302) of the optical members (filters 30 with their respective lenses) arranged in the double columns respectively, wherein a wavelength division multiplexed light ray composed of a multiplicity of light rays having different wavelengths multiplexed therein is incident on the mirror section of one of the plurality of optical members (filters 30 with their respective lenses), wherein the light rays reflected off the mirror sections (301) of the optical members (filters 30 with their respective lenses) in the opposite columns are incident on other optical members (filters 30 with their respective lenses) respectively excluding the one of the plurality of optical members (filters 30 with their respective lenses), wherein the light rays transmitted to be dispersed through the mirror sections (301), and converged by the lens sections (302) are passed, in turn, into the plurality of optical elements (20) respectively.

Although the embodiment of the present invention has been described above, the embodiment described above should not be construed to limit the invention in the appended claims. It should also be noted that not all the combinations of the features described in the above embodiments are essential to the means for solving the problems of the invention.

Figure 11:
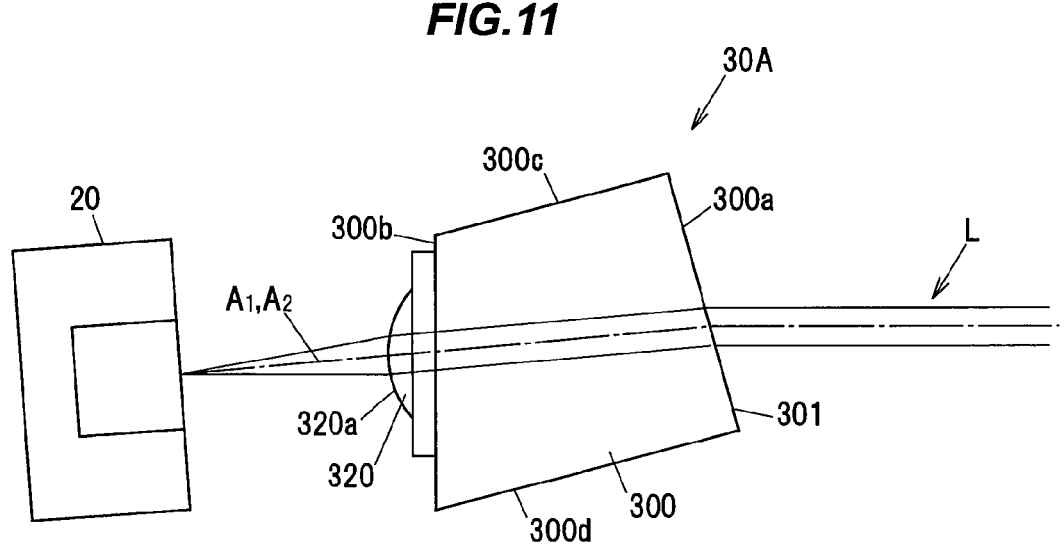
FIG. 11 is a plan view showing a portion of an optical system using a filter with its lens in a modification.

Further, the present invention may be appropriately modified and practiced without departing from the spirit and scope thereof. For example, although in the above embodiments it has been described that the bases 300 of the filters 30 with their respective lenses are in a rectangular cuboid shape, and the first side surface 300*a* formed with the mirror sections 301 thereon and their respective second side surfaces 300*b* provided with the lens sections 302 thereon are parallel to each other, the first side surface 300*a* and their respective second side surfaces 300*b* may be non-parallel, and the central axes $A_1$ of the lens sections 302 may be aligned with the optical axes $A_2$ of signal light rays L of the optical elements 20 respectively, as shown in FIG. 11. In this case, since the lens sections 302 face the optical elements 20 respectively, the positioning of the filters 30 with their respective lenses is facilitated.

Figure 12:
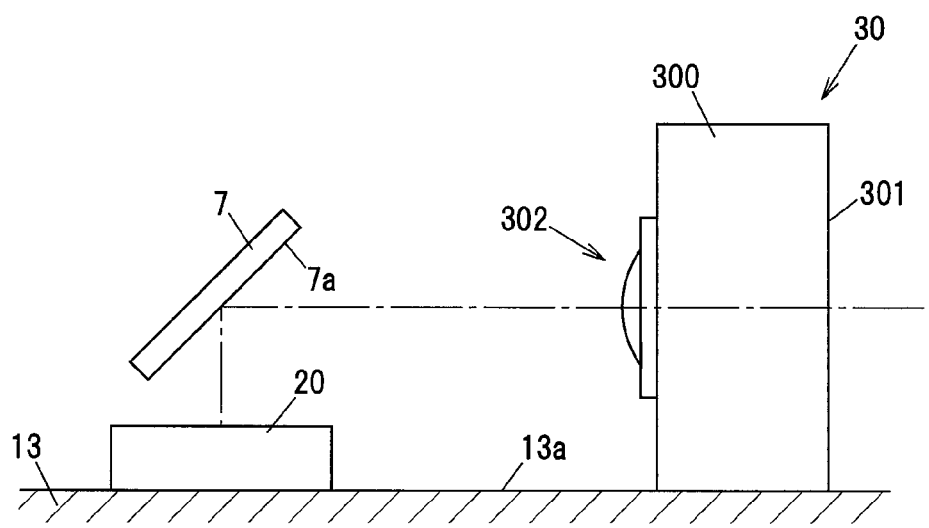
FIG. 12 is a schematic view showing a portion of an optical system using an optical element in a modification.

Further, as the optical elements 20, there may be used a surface light emitting element to emit signal light perpendicular to the mounting surface 13a of the base 13, or a surface light receiving element to receive signal light perpendicular to the mounting surface 13a of the base 13, to reflect the signal light ray off a reflecting surface 7a of a mirror 7 as shown in FIG. 12. In this case, the mirror 7 is supported by an unillustrated supporting member, and the reflecting surface 7a is tilted at an angle of 45 degrees to the mounting surface 13a of the base 13.

The numbers of the optical elements 20 and the filters 30 with their respective lenses constituting the optical system 10 or 100 are not limited to those exemplified in the above described embodiments, but may appropriately be increased or decreased depending on applications thereof.

In addition, the mirror section 301 of the first filter 31 with its lens in the first and third embodiments may not be formed with the multi-layer film filter thereon, but may transmit all the wavelength light rays. The same applies to the filter 30 with their lens at one end (upper end) of the second filter column 30B shown in FIG. 8.

Further, although in the above embodiments it has been described that the whole mounting surface 13a of the base 13 is composed of the electrically conductive metal, it is not limited thereto, but the base 13 may be composed of a printed circuit board, for example. In this case, the mounting surface 13a of the base 13 is the mounting surface of the printed circuit board. Furthermore, the shape and configuration of the casing member 11 is not limited to those illustrated in FIG. 1, but may appropriately be modified, and it is also possible to omit the optical isolator 15.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical module, comprising:
   a plurality of optical elements to emit or receive light rays having wavelengths different from each other;
   a plurality of optical members which are independent and separated from each other are arranged in correspondence with the plurality of optical elements respectively such that each optical member is aligned to each corresponding optical element independently from each other, the plurality of optical members each including a mirror section to transmit a predetermined transmission band wavelength light ray while reflecting a predetermined reflection band wavelength light ray, and a lens section located opposite the corresponding optical element, the plurality of optical members being positioned and disposed in such a manner that the respective lens sections thereof collimate or converge the light rays to be emitted or received by the plurality of optical elements respectively, while the respective mirror sections thereof multiplex or demultiplex the light rays to be emitted or received by the plurality of optical elements respectively;
   and
   a casing member and a base mounted within the casing member, the base mounting the plurality of optical elements and the plurality of optical members,
   wherein the optical members each of which includes a translucent polyhedral base section in such a manner that the respective mirror sections thereof are formed on respective first side surfaces of the respective polyhedral base sections respectively, while the respective lens sections thereof are provided on respective second side surfaces respectively,
   wherein the plurality of the optical members includes lower surfaces orthogonal to both the respective first side surfaces and the respective second side surfaces, the lower surfaces being adhesively fixed on a mounting surface of the base.

2. The optical module according to claim 1, wherein the translucent polyhedral base sections of the optical members are in a rectangular cuboid shape in such a manner that the respective lens sections thereof are provided on respective opposite side surfaces to the respective first side surfaces respectively,
   wherein central axes of optical paths of the light rays transmitted through the lens sections are tilted relative to central axes of the lens sections respectively.

3. The optical module according to claim 1, wherein the plurality of optical elements are light emitting elements that emit light rays having wavelengths different from each other,
   wherein the optical module further includes a reflecting member with a reflecting surface to reflect the light rays transmitted through the respective mirror sections of other optical members excluding one of the plurality of optical members,
   wherein the plurality of optical members are arranged in a column in such a manner that the respective mirror sections thereof are parallel to the reflecting surface of the reflecting member,
   wherein the light rays transmitted through the respective mirror sections of the other optical members are reflected off the reflecting surface of the reflecting member and are incident on the respective mirror sections of adjacent optical members respectively, in such a manner that the signal light rays of the plurality of optical elements are superimposed on top of each other.

4. The optical module according to claim 1, wherein the plurality of optical elements are light receiving elements to receive a light ray and convert it into an electric signal,
   wherein a reflecting member is positioned on the base with a reflecting surface parallel to the respective mirror sections of the plurality of optical members,
   wherein the plurality of optical members are arranged in a column in an alignment direction parallel to the reflecting surface of the reflecting member,
   wherein a wavelength division multiplexed light ray composed of a multiplicity of light rays having different wavelengths multiplexed therein is incident on the mirror section of one of the plurality of optical members,
   wherein the light rays reflected off the respective mirror sections of the optical members and the reflecting surface of the reflecting member are, in turn, incident on other adjacent optical members respectively in the alignment direction, excluding the one of the plurality of optical members.

5. The optical module according to claim 1, wherein the plurality of optical members are arranged in double columns in such a manner that the respective mirror sections thereof face each other, wherein the plurality of optical elements are arranged in double columns in such a manner as to be located opposite the respective lens sections of the optical members arranged in the double columns respectively, and the plurality of optical elements emit the light rays having wavelengths different from each other toward the lens sections respectively, wherein the light rays transmitted through the respective mirror sections of optical members in one column of the plurality of optical members disposed in the double columns are reflected off the respective mirror sections of optical members in an other column, in such a manner that the signal light rays of the plurality of optical elements are, in turn, superimposed on top of each other.

6. The optical module according to claim 1, wherein the plurality of optical members are arranged in double columns in such a manner that the respective mirror sections thereof face each other, wherein the plurality of optical elements are arranged in double columns in such a manner as to be located opposite the respective lens sections of the optical members arranged in the double columns respectively, wherein a wavelength division multiplexed light ray composed of a multiplicity of light rays having different wavelengths multiplexed therein is incident on the mirror section of one of the plurality of optical members, wherein the light rays reflected off the respective mirror sections of the optical members in the opposite columns are incident on other optical members respectively excluding the one of the plurality of optical members, wherein the light rays transmitted to be dispersed through the mirror sections, and converged by the lens sections are passed, in turn, into the plurality of optical elements respectively.

\* \* \* \* \*